US011229958B2

(12) United States Patent
Kauper et al.

(10) Patent No.: US 11,229,958 B2
(45) Date of Patent: Jan. 25, 2022

(54) STEP DRILL

(71) Applicant: Kennametal Inc., Latrobe, PA (US)

(72) Inventors: Herbert Rudolf Kauper, Erlangen (DE); Jürgen Schwägerl, Vohenstrauss (DE)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/844,375

(22) Filed: Apr. 9, 2020

(65) Prior Publication Data

US 2020/0324347 A1 Oct. 15, 2020

(30) Foreign Application Priority Data

Apr. 11, 2019 (DE) .......................... 102019109587.5

(51) Int. Cl.
*B23B 51/00* (2006.01)

(52) U.S. Cl.
CPC ...... *B23B 51/009* (2013.01); *B23B 2251/408* (2013.01); *B23B 2251/48* (2013.01); *Y10T 408/906* (2015.01)

(58) Field of Classification Search
CPC ............... B23B 51/009; B23B 2251/48; Y10T 408/906
See application file for complete search history.

(56) References Cited

U.S. PATENT DOCUMENTS

| 5,816,753 | A  | * | 10/1998 | Hall ...................... B23B 51/048 408/224 |
| 9,004,826 | B2 | * | 4/2015 | Wedner ................. B23B 51/009 408/224 |
| 9,180,530 | B2 | * | 11/2015 | Gey ......................... B23C 5/18 |
| 10,751,810 | B2 | * | 8/2020 | Wang ..................... B23B 51/02 |
| 2009/0074527 | A1 | * | 3/2009 | Kamizaki ............... B23B 51/02 408/230 |
| 2015/0093205 | A1 | * | 4/2015 | Krenzer ................ B23B 51/009 408/1 R |
| 2018/0318939 | A1 | * | 11/2018 | Harada .................. B23D 77/00 |

FOREIGN PATENT DOCUMENTS

| JP | 2013013983 A | * | 1/2013 |
| WO | WO-0044518 A1 | * | 8/2000 | ........... B23B 51/009 |
| WO | WO-2017059466 A1 | * | 4/2017 | ........... B23B 51/009 |

* cited by examiner

*Primary Examiner* — Eric A. Gates
(74) *Attorney, Agent, or Firm* — Larry R. Meenan

(57) ABSTRACT

The invention relates to a step drill having a shaft section extending along a longitudinal axis of the step drill and a cutting section with a cutting tip, and having a chip-breaking geometry which comprises a concavely curved surface and is configured such that ribbon chips are broken on the concavely curved surface during rotation of the step drill, whereby the chip-breaking geometry is disposed on a reaming step of the step drill.

9 Claims, 8 Drawing Sheets

STEP DRILL

RELATED APPLICATION DATA

The present application claims priority pursuant to 35 U.S.C. § 119(a) to German Patent Application Number 102019109587.5 filed Apr. 11, 2019, which is incorporated herein by reference in its entirety.

FIELD

The present invention relates to a step drill having a chip-breaking geometry.

BACKGROUND

When machining a metallic material with a step drill, metal chips are produced, which are transported from the cutting tip to a shaft section via flutes as the step drill rotates. Due to the relatively small speed differences at the outer edges of the step drill in the region of a reaming step, relatively long ribbon chips can form. These can cause problems, however, because they can wrap around the step drill, which creates so-called nests of chips that can hinder the rotation of the step drill and damage it.

SUMMARY

It is therefore an object of the present invention to provide a step drill having a chip-breaking geometry that is suitable for preventing the formation of long ribbon chips.

According to the invention, said object is achieved by a step drill having a shaft section extending along a longitudinal axis of the step drill and a cutting section with a cutting tip, and having a chip-breaking geometry which comprises a concavely curved surface and is configured such that ribbon chips are broken on the concavely curved surface during rotation of the step drill, whereby the chip-breaking geometry is disposed on a reaming step of the step drill.

The chip-breaking geometry thus prevents the chips from reaching a critical length that could damage the step drill. At the latest when the chips hit the reaming step of the step drill, the chips curl and are broken. This means that the chips do not become much longer than the distance between the cutting tip and the reaming step.

As the step drill rotates, for example, the ribbon chips curl on the concavely curved surface and are thereby broken.

According to one embodiment, the chip-breaking geometry can comprise at least one flat surface in addition to the concavely curved surface. The flat surface can be used to align the chips.

The concavely curved surface can be multiply curved. A transition of the chip-breaking geometry to a surrounding surface can therefore be particularly flat, as a result of which ribbon chips can move particularly well into the chip-breaking geometry.

The concavely curved surface can consist of a plurality of curved sections, wherein at least two of the plurality of sections have a different radius of curvature. The concavely curved surface has three different curved sections, for example. This makes it even easier to curl the ribbon chips.

According to one embodiment, the step drill has a plurality of flutes, wherein each flute is associated with a chip-breaking geometry, in particular a concavely curved surface. Consequently all chips, regardless of the flute they are in, always encounter a chip-breaking geometry.

The chip-breaking geometry is in particular spaced apart from the cutting tip in the longitudinal direction of the step drill. This allows the chips to be moved a certain distance in a flute before they hit the chip-breaking geometry, which has the advantage that the chips hit the chip-breaking geometry with a specific orientation. The chips can thus be reliably curled and broken by the chip-breaking geometry.

According to one embodiment, the chip-breaking geometry is a depression in a surface of the cutting section, in particular in a surface of a flute. This makes it possible to achieve a deflection of a chip striking the chip-breaking geometry that is large enough to break the chip. Furthermore, the outer dimensions and the cutting behavior of the step drill are not negatively affected by the chip-breaking geometry.

Flutes can extend helically along a longitudinal direction of the step drill, for example, wherein, when viewing the step drill from the side, the depression extends along a helical outer edge of a flute. The depression therefore extends along an extension direction of the flutes, and consequently also along a transport direction of the chips. The chips are thus moved toward the chip-breaking geometry by a rotation of the step drill during operation via the flutes.

The depression can have a flat section, which is adjoined by the concavely curved surface. The flat section can also be used to align the chips in a certain way before the chips hit the concavely curved surface.

According to one embodiment, the depression can have an arcuate contour when viewed from the cutting tip in a plan view of the step drill. This allows the chips to be curled into a spiral, which makes the chips break particularly reliably.

The chip-breaking geometry extends beyond the reaming step of the step drill, for example. The difference in the outer diameter, viewed in longitudinal direction before and after the reaming step, can thus be used to provide a suitable chip-breaking geometry. The curved surface, in particular, can have a sufficiently large radius of curvature.

BRIEF DESCRIPTION OF THE DRAWINGS

Further advantages and features of the invention result from the following description and from the following drawings, to which reference is made. The drawings show.

DETAILED DESCRIPTION

Figure 1:
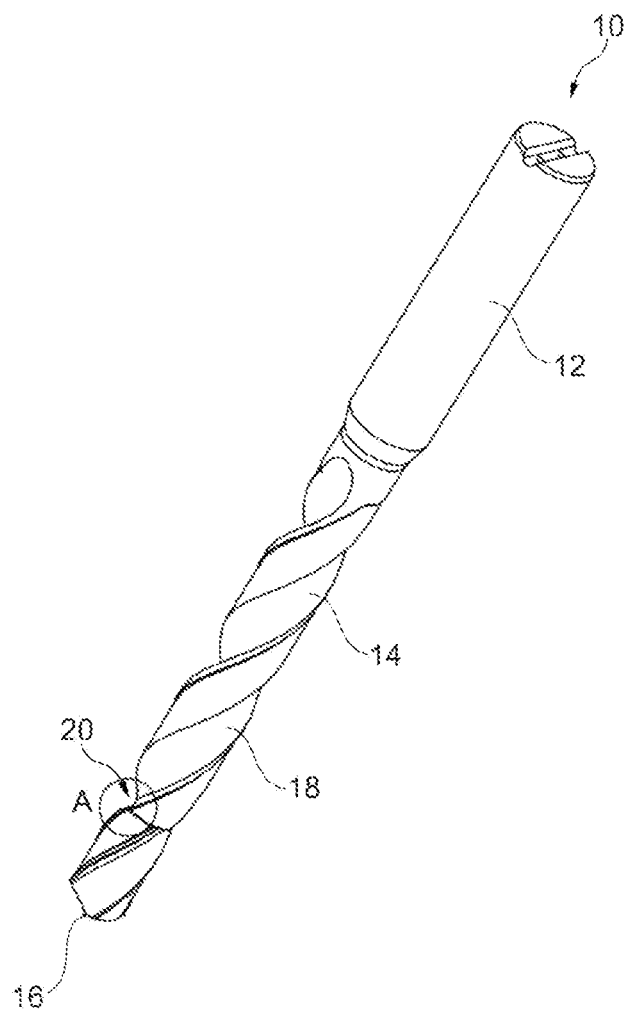
FIG. 1 a step drill according to the invention according to a first embodiment, FIG. 2 a portion of the cutting section of the step drill of FIG. 1, FIG. 3 a detail view of the region A of FIG. 1, FIG. 4 a side view of the step drill of FIG. 1, FIG. 5 a detail view of the region B of FIG. 4, FIG. 6 a further side view of the step drill of FIG. 4, wherein the step drill has been rotated 45° relative to FIG. 4, FIG. 7 a detail view of the region C of FIG. 6, FIG. 8 a portion of a cutting section of a step drill according to a further embodiment according to the invention, FIG. 9 a plan view onto the cutting section of FIG. 8, FIG. 10 a detail view of the region D of FIG. 9, FIG. 11 a side view of the step drill according to FIG. 8, FIG. 12 a detail view of the region E of FIG. 11, FIG. 13 a further side view of the step drill of FIG. 8, wherein the step drill has been rotated 45° relative to FIG. 11, and FIG. 14 a detail view of the region F of FIG. 13.

FIG. 1 shows a step drill 10 having a shaft section 12 and a cutting section 14, both of which extend along a longitudinal axis of the step drill 10. At his free end, the cutting section 14 has a cutting tip 16. A plurality of flutes 18 extend along the cutting section 14 as well.

When machining a workpiece with the step drill 10, rotation of the step drill 10 produces chips at the cutting tip 16, which are transported to a surface of the workpiece via the flutes 18.

The use of conventional step drills can produce relatively long ribbon chips, which is undesirable because they can wrap around the step drill. This can damage the drill.

To prevent the occurrence of such long ribbon chips, the step drill 10 according to the invention has a chip-breaking geometry 20, on which ribbon chips are broken when the step drill 10 rotates, in particular by being curled on the chip-breaking geometry 20.

Figure 2:
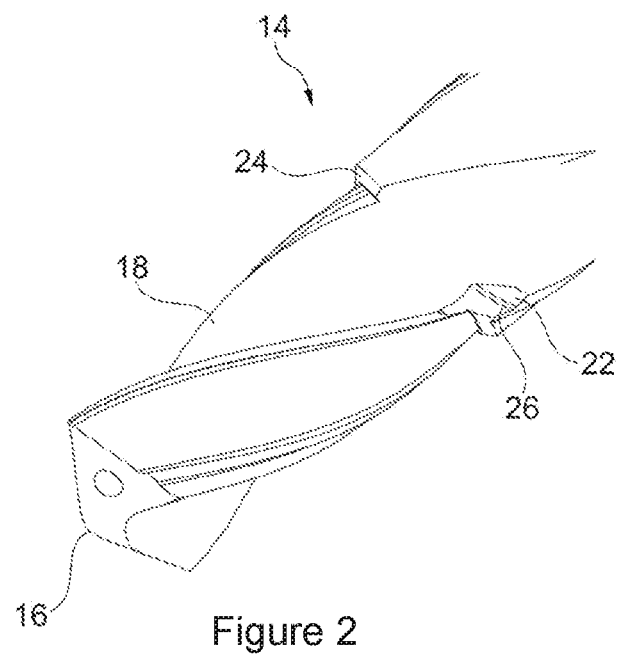

The chip-breaking geometry 20 can be seen in FIG. 2, which shows an enlarged section of the cutting section 14.

To curl the ribbon chips that are produced when the step drill 10 rotates, the chip-breaking geometry 20 comprises a concavely curved surface 22 disposed on a reaming step 24 of the step drill 10. The chip-breaking geometry 20 in particular extends beyond the reaming step 24 of the step drill 10.

Each one of the plurality of flutes 18 is in particular associated with a chip-breaking geometry 20, in particular with a concavely curved surface 22.

The chip-breaking geometry 20 is a depression 26 in a surface of the cutting section 14, in particular in a surface of a respective flute 18.

Figure 3:
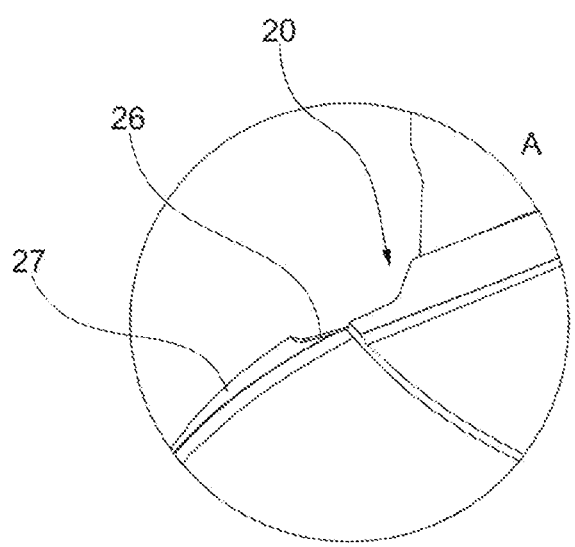

FIG. 3 shows a detail view of the region A of FIG. 1. In this view, the depression 26 of the chip-breaking geometry 20 is shown in a side view.

As can be seen in FIG. 3, the depression 26 extends along a helical outer edge 27 of a respective flute 18. The flutes 18 themselves extend helically along a longitudinal direction of the step drill 10.

The depression 26 can optionally have a flat section, which is adjoined by the concavely curved surface 22.

Figure 4:
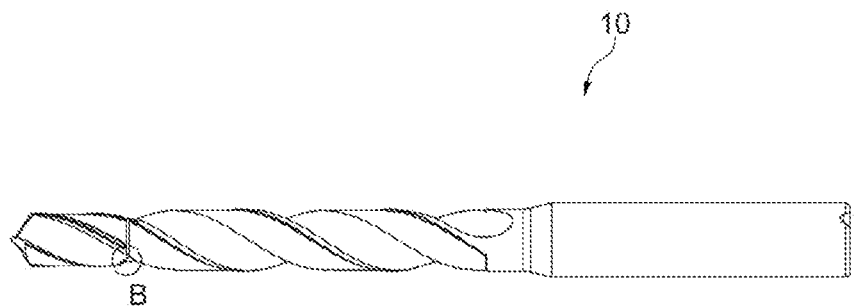

FIG. 4 shows the step drill 10 of FIG. 1 in a side view.

Figure 5:
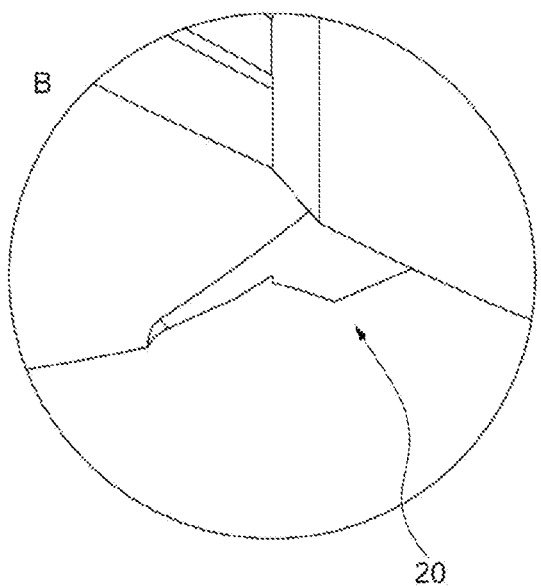

FIG. 5 shows a detail view of the region B of FIG. 4.

FIGS. 4 and 5 show a further perspective of the chip-breaking geometry 20.

Figure 6:
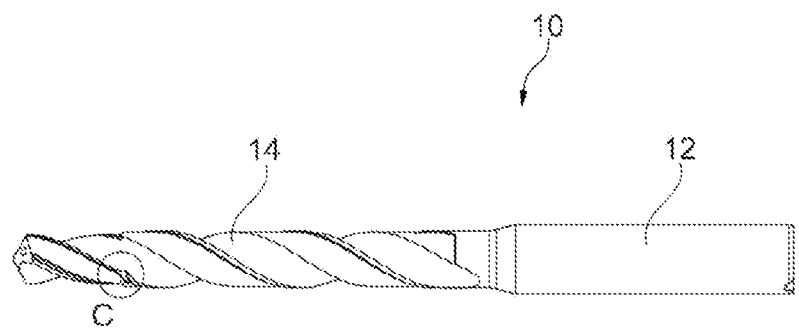

FIG. 6 shows the step drill 10 of FIG. 1 in a further side view. In this case, the step drill 10 has been rotated 45° relative to FIG. 4.

Figure 7:
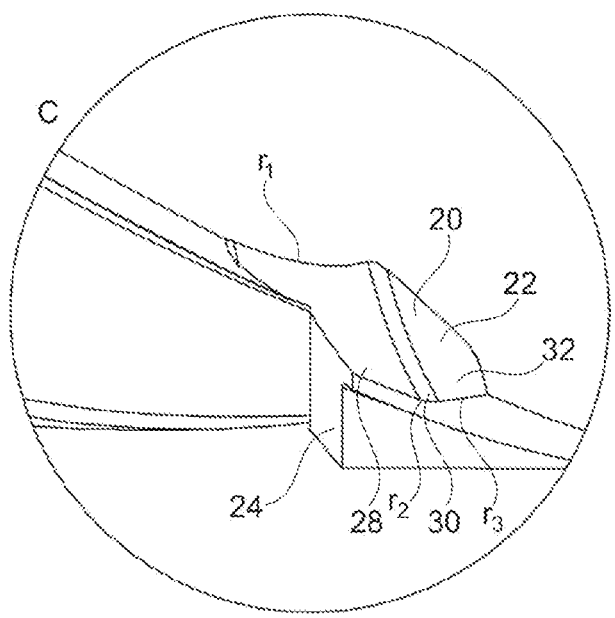

FIG. 7 shows a detail view of the region C of FIG. 6. This view shows particularly clearly how the chip-breaking geometry 20 extends beyond the reaming step 24.

FIG. 7 also shows that the concavely curved surface 22 consists of a plurality of curved sections 28, 30, 32, which in particular adjoin one another in the longitudinal direction of the step drill 10. Each one of these has a different radius of curvature.

The section 28, which is located closest to the cutting tip 16, has the smallest radius of curvature $r_1$.

The section 30, which directly adjoins the section 28, has a radius of curvature $r_2$ that is greater than the radius of curvature $r_1$ of the section 28.

The section 32, on the other hand, which is furthest away from the cutting tip 16, has a radius of curvature $r_3$ that is greater than the radii of curvature $r_1$ and/or $r_2$.

The concavely curved surface 22 is furthermore multiply curved, in particular in the longitudinal direction and in the circumferential direction of the step drill 10. In doing so, the concavely curved surface 22 is curved more strongly along a longitudinal direction of the step drill 10 than in the circumferential direction of the step drill 10. The chips are thus predominantly curled in the longitudinal direction of the step drill 10.

FIGS. 8 to 14 show a further embodiment of a step drill 10 according to the invention.

Identical structures with identical functions, which are known from the embodiment above, are designated in the following with the same reference signs and in this respect reference is made to the previous explanations, whereby the differences of the respective embodiments are described below in order to avoid repetitions.

Figure 8:
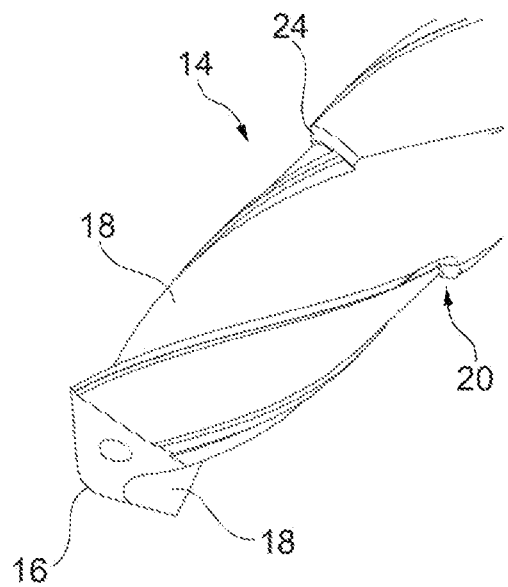

FIG. 8 shows a portion of the cutting section 14 of the step drill 10. In this embodiment, too, the chip-breaking geometry 20 is disposed on the reaming step 24 and comprises a concavely curved surface 22 that can be seen in FIG. 10.

Figure 9:
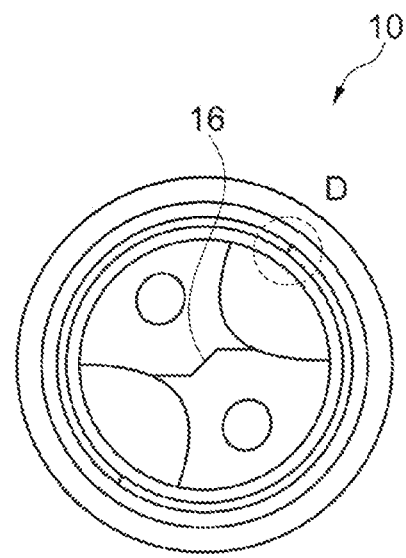
Figure 10:
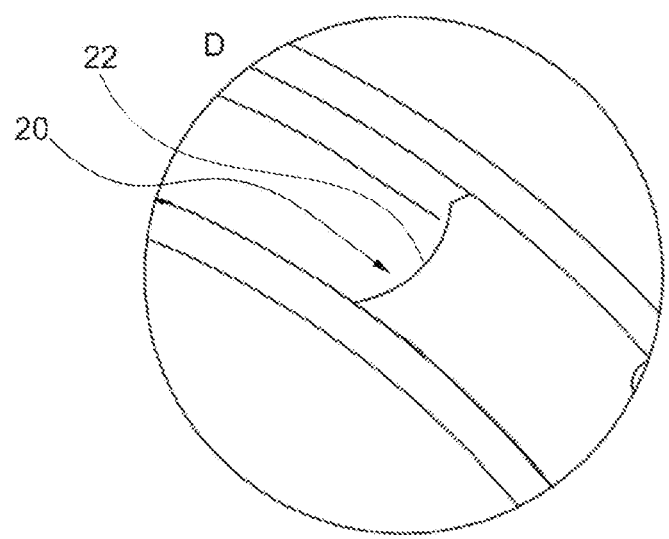

FIG. 9 shows a plan view onto the step drill 10 viewed from the cutting tip 16. FIG. 10 shows a detail view of the region D of FIG. 9.

FIG. 10 shows that the chip-breaking geometry 20, which is likewise a depression 26 in the surface of the cutting section 14, has an arcuate contour when viewed from the cutting tip 16 in a plan view of the step drill 10. This contour also causes ribbon chips to curl and break when the step drill 10 rotates. The chip-breaking geometry 20 is in particular shaped like a channel.

In contrast to the embodiment shown in FIGS. 1 to 7, the concavely curved surface 22 of the chip-breaking geometry 20 has a stronger curvature in the circumferential direction of the step drill 10 than in the longitudinal direction of the step drill 10. As a result, the chips are predominantly curled in the circumferential direction of the step drill 10.

Figure 11:
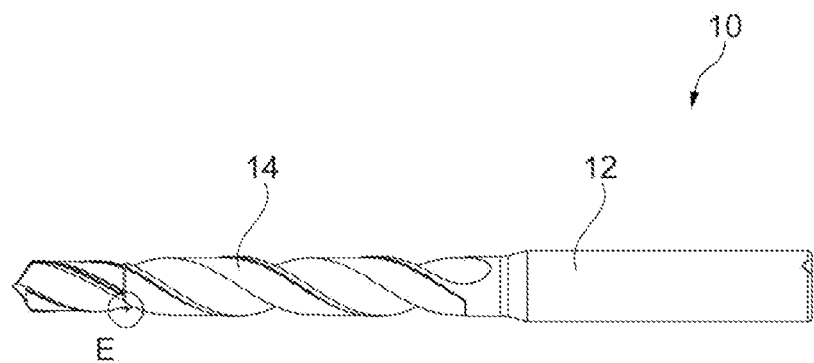

FIG. 11 shows the step drill 10 of FIG. 8 in a side view.

Figure 12:
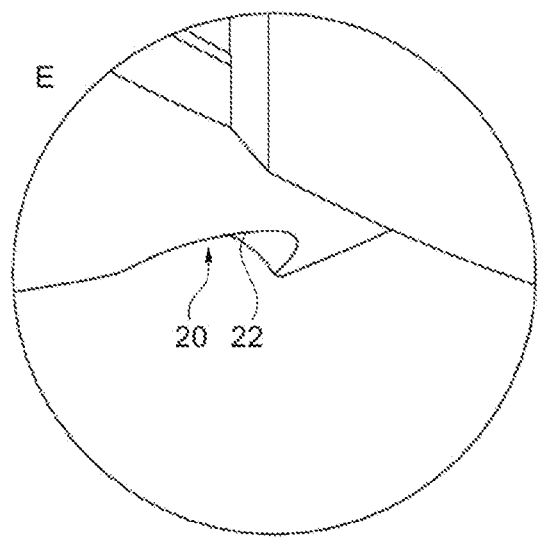

FIG. 12 shows a detail view of the region E of FIG. 11, which shows the chip-breaking geometry 20 from the side. FIG. 12 also shows the channel shape of chip-breaking geometry 20.

Figure 13:
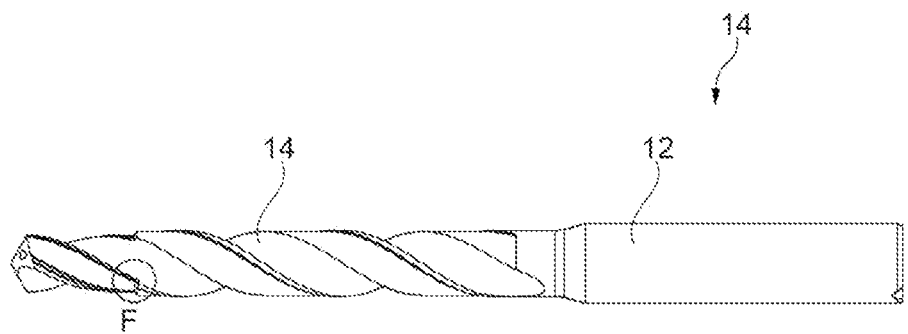

FIG. 13 shows the step drill 10 of FIG. 8 in a further side view. In this view, the step drill 10 has been rotated 45° relative to FIG. 11. This view shows a further perspective of the chip-breaking geometry 20.

Figure 14:
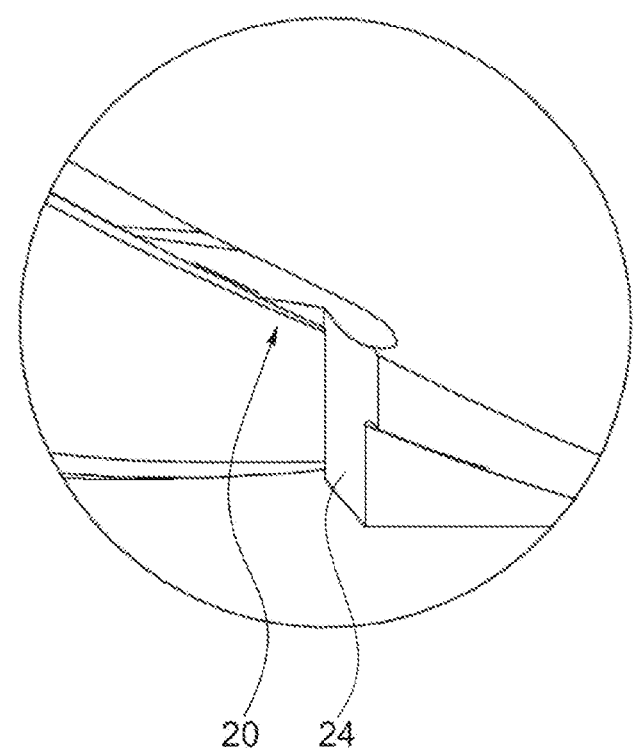

FIG. 14 shows a detail view of the region F of FIG. 13. Like FIG. 8, this view shows the arrangement of the chip-breaking geometry 20 on the reaming step 24.

The invention claimed is:

1. A step drill comprising a shaft section extending along a longitudinal axis of the step drill and a cutting section with a cutting tip, the cutting section having a chip-breaking geometry comprising a concavely curved surface configured such that ribbon chips are broken on the concavely curved surface during rotation of the step drill, wherein the chip-breaking geometry is disposed on a reaming step of the step drill, wherein the chip-breaking geometry comprises a depression in a surface of a flute, and wherein the depression has an arcuate contour when viewed from the cutting tip in a plan view of the step drill.

2. The step drill according to claim 1, wherein the chip-breaking geometry further comprises at least one flat surface.

3. The step drill according to claim 1, wherein the concavely curved surface comprises a plurality of curved sections.

4. The step drill according to claim 3, wherein at least two of the plurality of curved sections have a different radius of curvature.

5. The step drill according to claim 1, wherein the step drill has a plurality of flutes, each flute having the chip-breaking geometry.

6. The step drill according to claim 1, wherein the chip-breaking geometry is spaced apart from the cutting tip in the longitudinal direction of the step drill.

7. The step drill according to claim 1, wherein the flute extends helically along a longitudinal direction of the step drill, and wherein, when viewing the step drill from the side, the depression extends along a helical outer edge of the flute.

8. The step drill according to claim 1, wherein the depression has a flat section, which is adjoined by the concavely curved surface.

9. The step drill according to claim 1, wherein the chip-breaking geometry extends beyond the reaming step of the step drill.

\* \* \* \* \*